(12) United States Patent
Chinzei et al.

(10) Patent No.: US 11,801,492 B2
(45) Date of Patent: Oct. 31, 2023

(54) EXHAUST GAS PURIFICATION CATALYST

(71) Applicant: TOYOTA JIDOSHA KABUSHIKI KAISHA, Toyota (JP)

(72) Inventors: Isao Chinzei, Toyota (JP); Takahiro Nishio, Toyota (JP); Takumi Tojo, Tajimi (JP); Yoshiteru Yazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/809,754

(22) Filed: Jun. 29, 2022

(65) Prior Publication Data

US 2023/0016121 A1 Jan. 19, 2023

(30) Foreign Application Priority Data

Jul. 6, 2021 (JP) ................. 2021-112149

(51) Int. Cl.
| | | |
|---|---|---|
| *B01J 21/06* | (2006.01) | |
| *B01J 23/10* | (2006.01) | |
| *B01J 23/46* | (2006.01) | |
| *B01J 23/63* | (2006.01) | |
| *B01J 35/00* | (2006.01) | |
| *F01N 3/28* | (2006.01) | |

(Continued)

(52) U.S. Cl.
CPC ........ *B01J 23/464* (2013.01); *B01D 53/9468* (2013.01); *B01D 53/9472* (2013.01); *B01J 21/04* (2013.01); *B01J 23/10* (2013.01); *B01J 35/0006* (2013.01); *F01N 3/2803* (2013.01); *B01D 2255/1025* (2013.01); *B01D 2255/908* (2013.01); *B01D 2255/9022* (2013.01); *B01D 2255/9032* (2013.01); *F01N 2370/02* (2013.01)

(58) Field of Classification Search
CPC ........ B01J 21/066; B01J 23/10; B01J 23/464; B01J 23/63; B01J 35/0006; F01N 3/2803
USPC ........................................ 502/304, 325, 349
See application file for complete search history.

(56) References Cited

U.S. PATENT DOCUMENTS

| | | | | |
|---|---|---|---|---|
| 5,139,992 A | * | 8/1992 | Tauster | ................ B01D 53/945 |
| | | | | 423/213.5 |
| 6,294,140 B1 | * | 9/2001 | Mussmann | ............... B01J 23/58 |
| | | | | 502/514 |

(Continued)

FOREIGN PATENT DOCUMENTS

| | | |
|---|---|---|
| CN | 104023826 A | 9/2014 |
| JP | 2019084467 A | 6/2019 |

*Primary Examiner* — Cam N. Nguyen
(74) *Attorney, Agent, or Firm* — Dickinson Wright, PLLC (57) ABSTRACT

The present disclosure provides an exhaust gas purification catalyst improved in OSC performance while maintaining an exhaust gas purification performance, which comprises a substrate and at least one catalyst layer formed on the substrate, wherein an uppermost catalyst layer contains a catalyst metal, a first OSC material having a pyrochlore structure, and a second OSC material having a higher oxygen storage/release rate than the first OSC material, wherein the uppermost catalyst layer consists of an upstream catalyst layer and a downstream catalyst layer, and wherein a proportion of a mass of the second OSC material based on a total mass of the first OSC material and the second OSC material is in a specific range in each of the upstream catalyst layer and the downstream catalyst layer.

3 Claims, 5 Drawing Sheets

(51) Int. Cl.
  *B01J 21/04* (2006.01)
  *B01D 53/94* (2006.01)

(56) References Cited

U.S. PATENT DOCUMENTS

| | | | | |
|---|---|---|---|---|
| 6,524,992 | B2* | 2/2003 | Mussmann | B01D 53/945 |
| | | | | 502/302 |
| 7,524,465 | B2* | 4/2009 | Kumar | B01J 23/44 |
| | | | | 422/180 |
| 7,608,561 | B2* | 10/2009 | Miyoshi | B01J 23/63 |
| | | | | 502/332 |
| 8,007,750 | B2* | 8/2011 | Chen | B01D 53/945 |
| | | | | 502/262 |
| 8,039,418 | B2* | 10/2011 | Kitamura | B01J 37/0244 |
| | | | | 502/328 |
| 8,071,502 | B2* | 12/2011 | Shimizu | B01J 35/0006 |
| | | | | 502/325 |
| 8,679,411 | B2* | 3/2014 | Akamine | B01J 37/0244 |
| | | | | 422/171 |
| 8,796,172 | B2* | 8/2014 | Chinzei | B01J 35/0006 |
| | | | | 502/262 |
| 8,853,120 | B2* | 10/2014 | Aoki | B01D 53/945 |
| | | | | 502/527.12 |
| 8,940,657 | B2* | 1/2015 | Segawa | B01J 37/0248 |
| | | | | 502/262 |
| 8,975,204 | B2* | 3/2015 | Hori | B01J 23/63 |
| | | | | 502/325 |
| 9,174,198 | B2* | 11/2015 | Kawabata | B01D 53/94 |
| 9,440,223 | B2* | 9/2016 | Aoki | B01J 35/0006 |
| 9,540,980 | B2* | 1/2017 | Hilgendorff | B01J 35/1019 |
| 9,579,633 | B2* | 2/2017 | Suzuki | B01D 53/9468 |
| 9,604,175 | B2* | 3/2017 | Hatfield | B01J 23/83 |
| 9,616,410 | B2* | 4/2017 | Okada | B01J 23/22 |
| 9,833,771 | B2* | 12/2017 | Goto | B01J 35/0006 |
| 9,839,902 | B2* | 12/2017 | Suzuki | B01J 37/0244 |
| 9,873,085 | B2* | 1/2018 | Yoshida | B01J 23/63 |
| 9,937,487 | B2* | 4/2018 | Miura | B01D 53/945 |
| 9,999,871 | B2* | 6/2018 | Aoki | B01J 23/44 |
| 10,010,873 | B2* | 7/2018 | Aoki | F01N 3/2828 |
| 10,143,968 | B2* | 12/2018 | Suzuki | B01J 35/0006 |
| 10,576,420 | B2* | 3/2020 | Chinzei | C01F 17/224 |
| 10,618,034 | B2* | 4/2020 | Kasuya | B01J 35/0006 |
| 10,753,248 | B2* | 8/2020 | Hirota | B01J 35/0006 |
| 10,773,209 | B2* | 9/2020 | Liu | B01J 37/0225 |
| 10,801,382 | B2* | 10/2020 | Ochiai | F01N 3/035 |
| 11,110,435 | B2* | 9/2021 | Onoe | B01J 35/0006 |
| 11,286,830 | B2* | 3/2022 | Saito | B01J 37/0244 |
| 11,396,837 | B2* | 7/2022 | Yoshimoto | B01J 23/83 |
| 11,400,436 | B2* | 8/2022 | Chinzei | B01D 53/9413 |
| 11,577,226 | B2* | 2/2023 | Nakahigashi | B01J 35/0006 |
| 2001/0036901 | A1* | 11/2001 | Koda | B01J 23/63 |
| | | | | 502/340 |
| 2008/0072578 | A1* | 3/2008 | Kumar | B01D 53/945 |
| | | | | 60/299 |
| 2009/0099011 | A1* | 4/2009 | Miura | B01J 37/0248 |
| | | | | 502/303 |
| 2009/0175773 | A1* | 7/2009 | Chen | B01J 20/3021 |
| | | | | 422/177 |
| 2013/0203588 | A1* | 8/2013 | Nobukawa | F01N 3/0807 |
| | | | | 502/355 |
| 2015/0252744 | A1* | 9/2015 | Onoe | B01J 23/63 |
| | | | | 60/285 |
| 2019/0126248 | A1 | 5/2019 | Chinzei et al. | |
| 2020/0070126 | A1* | 3/2020 | Hara | B01J 35/0013 |
| 2021/0199037 | A1* | 7/2021 | Shimano | B01J 35/023 |
| 2021/0301706 | A1* | 9/2021 | Chinzei | B01J 21/14 |
| 2022/0055021 | A1* | 2/2022 | Liu | B01D 53/9472 |
| 2022/0161236 | A1* | 5/2022 | Vjunov | B01J 23/42 |

* cited by examiner

Fig. 5

EXHAUST GAS PURIFICATION CATALYST

CROSS REFERENCE TO RELATED APPLICATIONS

The present application claims priority from Japanese patent application JP 2021-112149 filed on Jul. 6, 2021, the entire content of which is hereby incorporated by reference into this application.

BACKGROUND

Technical Field

The present disclosure relates to an exhaust gas purification catalyst.

Background Art

An exhaust gas discharged from an internal combustion engine of an automobile and the like contains harmful components, such as carbon monoxide (CO), hydrocarbons (HC), and nitrogen oxides (NOx), and the harmful components are removed by an exhaust gas purification catalyst before discharged into the atmosphere. Conventionally, a three-way catalyst that simultaneously performs oxidation of CO and HC and reduction of NOx is used as the exhaust gas purification catalyst, and a catalyst that contains a noble metal, such as platinum (Pt), palladium (Pd), and rhodium (Rh), as a catalyst metal is widely employed.

To efficiently remove the harmful components in the exhaust gas by using the three-way catalyst, an air-fuel ratio (A/F) as a ratio of air to fuel in an air-fuel mixture supplied to an internal combustion engine must be close to a theoretical (stoichiometric) air-fuel ratio. However, the actual air-fuel ratio becomes rich (fuel excessive: A/F<14.7) or lean (oxygen excessive: A/F>14.7) around the stoichiometric air-fuel ratio depending on the travel condition or the like of the automobile, and the exhaust gas correspondingly becomes rich or lean.

Recently, to improve the exhaust gas purification performance of the three-way catalyst against the fluctuation of the oxygen concentration in the exhaust gas, an OSC material as an inorganic material having an Oxygen Storage Capacity (OSC) is used for a catalyst layer of an exhaust gas purification catalyst. The OSC material causes NOx in the exhaust gas to be easily reduced by storing oxygen when the air-fuel mixture is lean and the oxygen concentration in the exhaust gas is high (lean exhaust gas), and causes CO and HC in the exhaust gas to be easily oxidized by releasing oxygen when the air-fuel mixture is rich and the oxygen concentration in the exhaust gas is low.

As the OSC material, ceria-zirconia based composite oxides have been widely used. It has been known that the OSC performance and the exhaust gas purification performance can be adjusted by using two OSC materials having different oxygen storage/release rates together as the OSC material.

As the example, JP 2019-84467 A discloses an exhaust gas purification catalyst having an OSC material with a pyrochlore structure and an OSC material with a higher oxygen storage/release rate than the OSC material with the pyrochlore structure are used together by predetermined contents in an uppermost layer of a catalyst coating layer.

Here, for example, when a ceria-zirconia based composite oxide is used as the OSC material, cerium reduces activity of a catalyst metal while expressing the OSC performance, thus possibly causing the reduction in exhaust gas purification performance. Therefore, when the OSC material is increased to improve the OSC performance, the exhaust gas purification performance is reduced. Thus, it has been difficult to improve the OSC performance while maintaining the exhaust gas purification performance in the exhaust gas purification catalyst using the OSC material. While the exhaust gas purification catalyst disclosed in JP 2019-84467 A is excellent in exhaust gas purification performance, OSC performance, and pressure loss, there has been a room for improvement in providing both the exhaust gas purification performance and the OSC performance.

SUMMARY

As described above, in the conventional exhaust gas purification catalyst using the two OSC materials having the different oxygen storage/release rates together, there has been a room for improvement in providing both the exhaust gas purification performance and the OSC performance. Accordingly, the present disclosure provides an exhaust gas purification catalyst improved in OSC performance while maintaining the exhaust gas purification performance.

The inventors examined various means to solve the problem, and found that an uppermost catalyst layer comprises an upstream catalyst layer and a downstream catalyst layer, and a balance between two OSC materials different in oxygen storage/release rate is optimized in the upstream catalyst layer and the downstream catalyst layer, thereby allowing improving an OSC performance. Thus, the inventors achieved the present disclosure.

That is, the gist of the present disclosure is as follows.

(1) An exhaust gas purification catalyst comprising: a substrate; and at least one catalyst layer formed on the substrate, wherein an uppermost catalyst layer contains a catalyst metal, a first OSC material having a pyrochlore structure, and a second OSC material having a higher oxygen storage/release rate than the first OSC material, and wherein the uppermost catalyst layer consists of an upstream catalyst layer formed in an upstream side in a flow direction of an exhaust gas, and a downstream catalyst layer formed in a downstream side in the flow direction of the exhaust gas, wherein a proportion of a mass of the second OSC material based on a total mass of the first OSC material and the second OSC material is from 0.55 to 0.73 in the upstream catalyst layer, and wherein a proportion of a mass of the second OSC material based on a total mass of the first OSC material and the second OSC material is from 0.27 to 0.55 in the downstream catalyst layer.

(2) The exhaust gas purification catalyst according to (1), wherein the first OSC material and the second OSC material are ceria-zirconia based composite oxides.

(3) The exhaust gas purification catalyst according to (1) or (2), wherein the catalyst metal is Rh.

(4) The exhaust gas purification catalyst according to any of (1) to (3), wherein the catalyst layer consists of one layer.

(5) The exhaust gas purification catalyst according to any of (1) to (4), wherein the upstream catalyst layer is formed in a range of from 40% to 80% of an entire length of the substrate from an end portion in the upstream side, and the downstream catalyst layer is formed in a range of from 40% to 80% of the entire length of the substrate from an end portion in the downstream side.

The present disclosure can provide an exhaust gas purification catalyst improved in OSC performance while maintaining the exhaust gas purification performance.

DETAILED DESCRIPTION

The following describes embodiments of the present disclosure in detail.

An exhaust gas purification catalyst of the present disclosure comprises a substrate and at least one catalyst layer formed on the substrate.

The substrate is not specifically limited, and any material generally used for exhaust gas purification catalysts can be used. Specifically, a honeycomb-shaped material having multiple cells can be used for the substrate, and for example, a ceramic material having heat resistance, such as cordierite ($2MgO \cdot 2Al_2O_3 \cdot 5SiO_2$), alumina, zirconia, and silicon carbide, and a metal material formed of a metal foil, such as a stainless steel, can be used. Among them, the cordierite is used in some embodiments from the aspect of cost.

The catalyst layer is formed on the substrate. An exhaust gas supplied to the exhaust gas purification catalyst contacts the catalyst layer while flowing through a flow passage of the substrate, thereby removing harmful components. For example, CO and HC included in the exhaust gas are oxidized by a catalytic function of the catalyst layer, and converted to water ($H_2O$), carbon dioxide ($CO_2$), and the like. NOx is reduced by the catalytic function of the catalyst layer, and converted to nitrogen ($N_2$).

The entire length of the catalyst layer is not specifically limited from the aspects of the appropriate conversion of the harmful components in the exhaust gas, the manufacturing cost, and the degree of freedom in equipment design, and the entire length of the catalyst layer is, for example, 2 cm to 30 cm, 5 cm to 15 cm in some embodiments, and may be about 10 cm.

The catalyst layer comprises at least one layer. For example, the catalyst layer consists of one layer, two layers, three layers, or four layers, consists of one layer or two layers in some embodiments, and may consist of one layer. For example, when the catalyst layer consists of two layers of an upper layer and a lower layer, the lower catalyst layer is formed on the substrate, and the upper catalyst layer is formed on the lower catalyst layer. For example, when the catalyst layer consists of three or more layers, similarly to the case where the catalyst layer consists of two layers, the lower most catalyst layer is formed on the substrate, and the other catalyst layers are formed thereon in sequence. In the present disclosure, while the uppermost catalyst layer comprises an upstream catalyst layer and a downstream catalyst layer, the upstream catalyst layer and the downstream catalyst layer are collectively referred to as one layer of the catalyst layer in the description.

The uppermost catalyst layer consists of the upstream catalyst layer formed in an upstream side in a flow direction of an exhaust gas, and a downstream catalyst layer formed in a downstream side in the flow direction of the exhaust gas. The upstream catalyst layer and the downstream catalyst layer may be partially overlapped. When the upstream catalyst layer and the downstream catalyst layer are partially overlapped, any of the upstream catalyst layer and the downstream catalyst layer may be the upper layer in the overlapped part. When the upstream catalyst layer and the downstream catalyst layer are partially overlapped, the upstream catalyst layer is the lower layer and the downstream catalyst layer is the upper layer in the overlapped part in some embodiments. The upstream catalyst layer is usually formed in a range of from 40% to 80% of the entire length of the substrate from an end portion in the upstream side, and formed in a range of from 50% to 70% in some embodiments. The downstream catalyst layer is usually formed in a range of from 40% to 80% of the entire length of the substrate from an end portion in the downstream side, and formed in a range of from 50% to 70% in some embodiments. In the exhaust gas purification catalyst of the present disclosure, not whole of the upstream catalyst layer and the downstream catalyst layer are overlapped one another.

Figure 1:
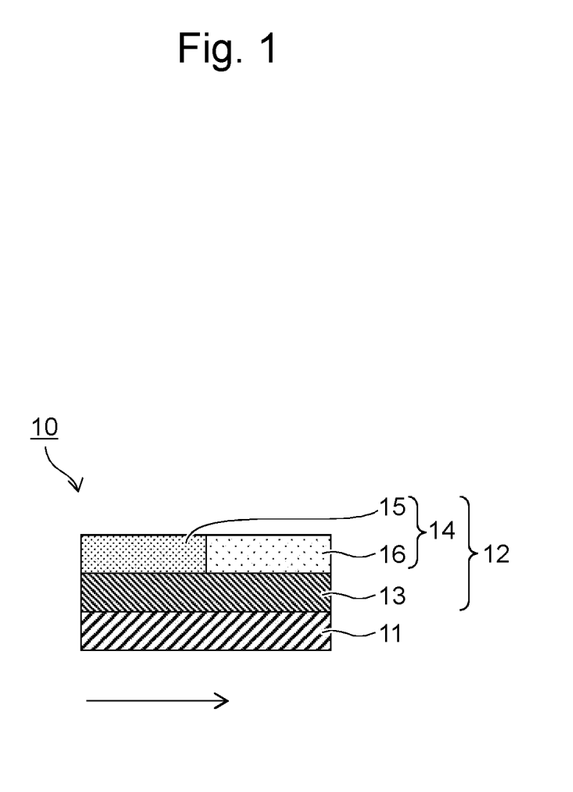
FIG. 1 is a cross-sectional schematic diagram illustrating one embodiment of an exhaust gas purification catalyst of the present disclosure.

FIG. 1 illustrates one embodiment of an exhaust gas purification catalyst according to the present disclosure in which a catalyst layer consists of two layers. As illustrated in FIG. 1, an exhaust gas purification catalyst 10 comprises a substrate 11, and a catalyst layer 12 that is formed on the substrate 11 and consists of two layers. The catalyst layer 12 consists of a lower catalyst layer 13 formed on the substrate 11, and an upper (uppermost) catalyst layer 14 formed on the lower catalyst layer 13. The upper catalyst layer 14 consists of an upstream catalyst layer 15 and a downstream catalyst layer 16. In FIG. 1, the upstream catalyst layer 15 and the downstream catalyst layer 16 are formed in ranges of up to about 50% of the entire length of the substrate from end portions in an upstream side and a downstream side, respectively in a flow direction of an exhaust gas. In FIG. 1, an arrow indicates the flow direction of the exhaust gas.

Figure 2:
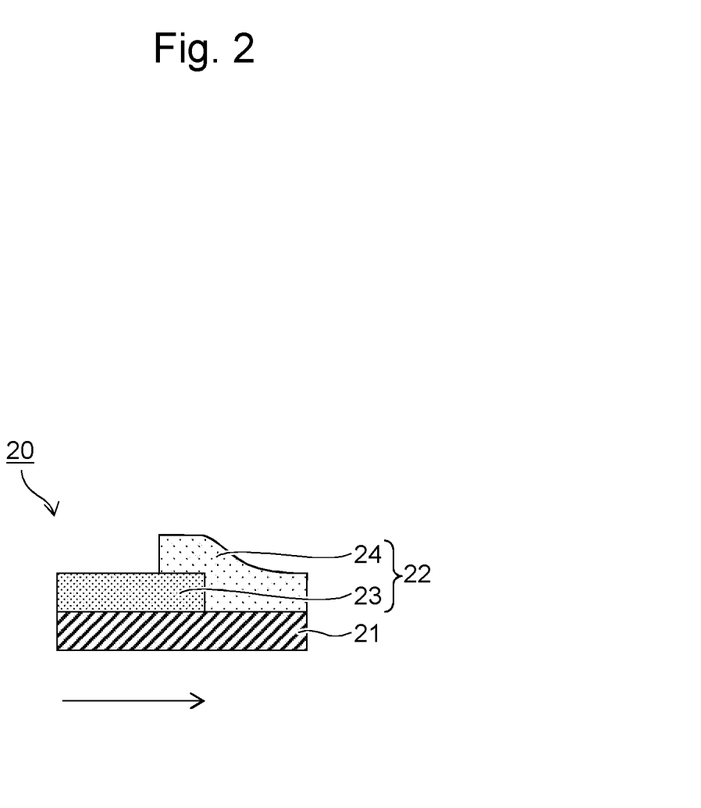
FIG. 2 is a cross-sectional schematic diagram illustrating one embodiment of the exhaust gas purification catalyst of the present disclosure.

FIG. 2 illustrates one embodiment of an exhaust gas purification catalyst according to the present disclosure in which a catalyst layer consists of one layer. As illustrated in FIG. 2, an exhaust gas purification catalyst 20 comprises a substrate 21, and a catalyst layer 22 that is formed on the substrate 21 and consists of one layer. The catalyst layer 22 consists of an upstream catalyst layer 23 and a downstream catalyst layer 24. In FIG. 2, the upstream catalyst layer 23 and the downstream catalyst layer 24 are formed in ranges of up to about 60% of the entire length of the substrate from end portions in an upstream side and a downstream side, respectively in a flow direction of an exhaust gas. In FIG. 2, an arrow indicates the flow direction of the exhaust gas.

The uppermost catalyst layer contains a catalyst metal, a first OSC material having a pyrochlore structure, and a second OSC material having a higher oxygen storage/release rate than the first OSC material.

As the catalyst metal, a conventionally-known catalyst metal used for exhaust gas purification catalysts can be used, and is not specifically limited. For example, any of metals included in the platinum group, an alloy mainly containing any of the metals included in the platinum group, or the like can be used in some embodiments. Examples of the metal included in the platinum group include rhodium (Rh), platinum (Pt), palladium (Pd), ruthenium (Ru), iridium (Ir), and osmium (Os), and Rh is used in some embodiments. Since Rh is significantly reduced in catalytic activity by increasing the OSC material when the OSC material contains, for example, cerium (Ce), an effect obtained by efficiently using the OSC material is large.

In the uppermost catalyst layer, the two OSC materials, the first OSC material having the pyrochlore structure and the second OSC material having the higher oxygen storage/release rate than the first OSC material, are used together.

The OSC material is an inorganic material having an oxygen storage capacity, stores oxygen when a lean exhaust gas is supplied, and releases the stored oxygen when a rich exhaust gas is supplied. As the OSC material, a composite oxide containing ceria ($CeO_2$) is widely used. Among the OSC materials, a ceria ($CeO_2$)-zirconia ($ZrO_2$) based composite oxide is used in some embodiments because the oxygen storage capacity is high and the cost is relatively low.

The first OSC material is an OSC material having the pyrochlore structure. While the OSC material having the pyrochlore structure is generally low in oxygen storage/release rate, an oxygen storage/release amount (hereinafter also referred to as an OSC amount) is large.

The pyrochlore structure is indicated as $A_2B_2O_7$ when two metal elements of A and B are contained and B is a transition metal element, a kind of a crystalline structure including a combination of $A^{3+}/B^{4+}$ or $A^{2+}/B^{5+}$, and generated when A has a relatively small ionic radius in the crystalline structure of such a configuration. For example, a chemical formula of a ceria-zirconia composite oxide having the pyrochlore structure is indicated as $Ce_2Zr_2O_7$, and Ce and Zr are regularly arranged in alternation with interposed oxygen. In the pyrochlore structure, the metal elements of A and B may be partially replaced with an additional element.

The first OSC material having the pyrochlore structure is low in oxygen storage/release rate compared with the second OSC material, and can still release oxygen even after the second OSC material has completely released oxygen. That is, the first OSC material having the pyrochlore structure can provide an oxygen storage capacity even after the peak of oxygen storage/release by the second OSC material. It is considered that this is because the OSC material having the pyrochlore structure is complicated in crystalline structure, and a path for storing/releasing oxygen is complicated. More specifically, in the first OSC material, a total amount of oxygen release from 10 seconds to 120 seconds after start of the oxygen release is, for example, from 60% to 95% based on 100% of the total amount of oxygen release from immediately after the start of the oxygen release (0 seconds after) to 120 seconds, may be from 70% to 90%, and from 75% to 85% in some embodiments.

For the first OSC material, a ceria-zirconia based composite oxide is used in some embodiments. The ceria-zirconia based composite oxide may be a ceria-zirconia composite oxide consisting of ceria and zirconia, or may contain an additional element other than cerium (Ce) or zirconium (Zr). The additional element is not specifically limited, and for example, rare earth elements excluding cerium and alkaline earth metal elements are included. As the rare earth elements excluding cerium, praseodymium (Pr), scandium (Sc), yttrium (Y), lanthanum (La), neodymium (Nd), samarium (Sm), gadolinium (Gd), terbium (Tb), dysprosium (Dy), ytterbium (Yb), lutetium (Lu), and the like are included. From the aspect that the heat resistance is high and the sufficient oxygen storage capacity is provided from a low temperature, Pr, La, Nd, or Y may be used, and Pr is used in some embodiments. As the alkaline earth metal elements, magnesium (Mg), calcium (Ca), strontium (Sr), barium (Ba), and radium (Ra) are included, and Mg, Ca, or Ba is used in some embodiments. A total content of the additional elements in the first OSC material is calculated as an oxide, and is usually 10 mass % or less, and 5 mass % or less in some embodiments based on the total mass of the first OSC material. A mass ratio between ceria and zirconia in the ceria-zirconia based composite oxide is, for example, from 10:1 to 1:10, from 5:1 to 1:5 in some embodiments, and may be from 2:1 to 1:2.

Meanwhile, the second OSC material is an OSC material having a higher oxygen storage/release rate than the first OSC material. The second OSC material has a small oxygen storage/release amount while having the high oxygen storage/release rate compared with the first OSC material having the pyrochlore structure. The second OSC material is different from the first OSC material in, for example, the crystalline structure, and specific examples of the crystalline structure of the second OSC material include a fluorite type structure.

For the second OSC material, a ceria-zirconia based composite oxide is used in some embodiments. The ceria-zirconia based composite oxide may be a ceria-zirconia composite oxide consisting of ceria and zirconia, or may contain an additional element other than cerium (Ce) or zirconium (Zr). The additional element is not specifically limited, and for example, rare earth elements excluding cerium and alkaline earth metal elements are included. As the rare earth elements excluding cerium, praseodymium (Pr), scandium (Sc), yttrium (Y), lanthanum (La), neodymium (Nd), samarium (Sm), gadolinium (Gd), terbium (Tb), dysprosium (Dy), ytterbium (Yb), lutetium (Lu), and the like are included. Among them, from the aspect that the heat resistance is high and the sufficient oxygen storage capacity is provided from a low temperature, Pr, La, Nd, or Y may be used, and La, Nd, or Y is used in some embodiments. As the alkaline earth metal elements, magnesium (Mg), calcium (Ca), strontium (Sr), barium (Ba), and radium (Ra) are included, and Mg, Ca, or Ba is used in some embodiments. The ceria-zirconia based composite oxide may contain aluminum (Al) as the additional element. In the one embodiment, the second OSC material is a ceria-zirconia based composite oxide containing alumina ($Al_2O_3$), lanthanum oxide ($La_2O_3$), neodymium oxide ($Nd_2O_3$), and yttria ($Y_2O_3$) in addition to ceria and zirconia. A total content of the additional elements in the second OSC material is calculated as an oxide, and is usually 50 mass % or less, and 40 mass % or less in some embodiments based on the total mass of the second OSC material. The ceria-zirconia based composite oxide containing alumina, lanthanum oxide, neodymium oxide, and yttria usually contains 20 mass % to 40 mass % of alumina, and 1 mass % to 10 mass % of lanthanum oxide, neodymium oxide, and yttria. A mass ratio between ceria and zirconia in the ceria-zirconia based composite oxide is, for example, from 10:1 to 1:10, from 5:1 to 1:5 in some embodiments, and may be from 3:1 to 1:3.

The uppermost catalyst layer may contain any other component in addition to the catalyst metal, the first OSC material, and the second OSC material. The other component is not specifically limited, and for example, a metal oxide is included. Examples of the metal contained in the metal oxide include one or more metals selected from group 3, group 4, and group 13 of the periodic table and a lanthanoid-based metal. When the metal oxide contains the oxides of two or more metals, it may be any of a mixture of two or more metal oxides, a composite oxide containing two or more metals, or a mixture of one or more metal oxides and one or more composite oxides.

The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al), or the oxide of one or more metals selected from Y, La, Nd, Zr, and Al in some embodiments. As the metal oxide, alumina ($Al_2O_3$) or a composite oxide containing alumina is used in some embodiments. For the composite oxide containing alumina, a composite oxide containing alumina and at least one selected from zirconia, lanthanum oxide, neodymium oxide, and yttria may be used, and a composite oxide of alumina and lanthanum oxide or a composite oxide of alumina, zirconia, lanthanum oxide, neodymium oxide, and yttria is used in some embodiments. The metal oxide is usable also as a carrier supporting the catalyst metal or the OSC material.

In the exhaust gas purification catalyst of the present disclosure, the two OSC materials having different properties are used together in the upstream catalyst layer and the downstream catalyst layer of the uppermost catalyst layer with an optimized ratio, thereby allowing improving the usage efficiency of the OSC materials, thus providing the improved OSC performance while maintaining the exhaust gas purification performance.

The upstream catalyst layer of the uppermost layer contains the catalyst metal, the first OSC material having the pyrochlore structure, and the second OSC material having the higher oxygen storage/release rate than the first OSC material, and contains another component such as a metal oxide in some cases. The catalyst metal, the first OSC material, the second OSC material, and the metal oxide are as described above for the uppermost catalyst layer.

In the upstream catalyst layer of the uppermost layer, the content of the catalyst metal is usually from 0.05 g/L to 1.0 g/L, and may be from 0.05 g/L to 0.6 g/L based on the substrate volume.

In the upstream catalyst layer of the uppermost layer, the content of the first OSC material is usually from 5 g/L to 50 g/L, and may be from 5 g/L to 40 g/L based on the substrate volume.

In the upstream catalyst layer of the uppermost layer, the content of the second OSC material is usually from 10 g/L to 135 g/L, and may be from 10 g/L to 110 g/L based on the substrate volume.

In the upstream catalyst layer of the uppermost layer, a proportion of the mass of the second OSC material to a total mass of the first OSC material and the second OSC material is from 0.55 to 0.73, and may be from 0.65 to 0.73. In the present disclosure, for example, the proportion of the mass from 0.55 to 0.73 means that the proportion of the mass is 0.55 or more to 0.73 or less. In the upstream catalyst layer into which the exhaust gas discharged from the engine directly flows, a reaction easily occurs because the concentration of the exhaust gas is high. In the upstream catalyst layer, when the proportion of the mass of the second OSC material is from 0.55 to 0.73, the OSC material can be efficiently used, and the catalyst can provide the high OSC performance compared with a case where the proportion of the mass of the second OSC material is out of the range.

The downstream catalyst layer of the uppermost layer contains the catalyst metal, the first OSC material having the pyrochlore structure, and the second OSC material having the higher oxygen storage/release rate than the first OSC material, and contains another component such as a metal oxide in some cases. The catalyst metal, the first OSC material, the second OSC material, and the metal oxide are as described above for the uppermost catalyst layer.

In the downstream catalyst layer of the uppermost layer, the content of the catalyst metal is usually from 0.05 g/L to 1.0 g/L, and may be from 0.05 g/L to 0.6 g/L based on the substrate volume.

In the downstream catalyst layer of the uppermost layer, the content of the first OSC material is usually from 5 g/L to 80 g/L, from 5 g/L to 30 g/L in some embodiments, and may be from 5 g/L to 20 g/L based on the substrate volume.

In the downstream catalyst layer of the uppermost layer, the content of the second OSC material is usually from 3 g/L to 60 g/L, from 3 g/L to 35 g/L in some embodiments, and may be from 3 g/L to 20 g/L based on the substrate volume.

In the downstream catalyst layer of the uppermost layer, a proportion of the mass of the second OSC material to a total mass of the first OSC material and the second OSC material is from 0.27 to 0.55, and may be from 0.27 to 0.45. In the downstream catalyst layer, it is difficult to cause a reaction because the concentration of the exhaust gas is low. In the downstream catalyst layer, when the proportion of the mass of the second OSC material is from 0.27 to 0.55, the OSC material can be efficiently used, and the catalyst can provide the high OSC performance compared with a case where the proportion of the mass of the second OSC material is out of the range.

In the exhaust gas purification catalyst of the present disclosure, when the catalyst layer comprises two or more layers, while at least one catalyst layer other than the uppermost layer only needs to contain the catalyst metal, the at least one catalyst layer may contain an OSC material, a metal oxide, and the like in addition to the catalyst metal.

As the catalyst metal, a conventionally-known catalyst metal used for exhaust gas purification catalysts can be used, and is not specifically limited. For example, any of metals included in the platinum group, an alloy mainly containing any of the metals included in the platinum group, or the like can be used in some embodiments. Examples of the metal included in the platinum group include rhodium (Rh), platinum (Pt), palladium (Pd), ruthenium (Ru), iridium (Ir), and osmium (Os).

For the OSC material, for example, the first OSC material, the second OSC material, and the like are usable.

Examples of the metal contained in the metal oxide include one or more metals selected from group 3, group 4, and group 13 of the periodic table and a lanthanoid-based metal. The metal oxide may be the oxide of one or more metals selected from, for example, scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al).

While the catalyst layers other than the uppermost layer are usually formed over the entire length of the substrate, they may consist of the upstream catalyst layer and the downstream catalyst layer similarly to the uppermost catalyst layer.

In some embodiments, the exhaust gas purification catalyst of the present disclosure comprises a substrate and a catalyst layer that is formed on the substrate and consists of one layer. The catalyst layer contains a catalyst metal, a first OSC material (ceria-zirconia based composite oxide, in some embodiments) having a pyrochlore structure, and a second OSC material (ceria-zirconia based composite oxide, in some embodiments) having a higher oxygen storage/release rate than the first OSC material. The catalyst layer consists of an upstream catalyst layer formed in an upstream side in a flow direction of an exhaust gas and a downstream catalyst layer formed in a downstream side in the flow direction of the exhaust gas. In the upstream catalyst layer, a proportion of a mass of the second OSC material is from 0.55 to 0.73 based on a total mass of the first OSC material and the second OSC material. In the downstream catalyst layer, the proportion of the mass of the second OSC material is from 0.27 to 0.55 based on the total mass of the first OSC material and the second OSC material.

The exhaust gas purification catalyst of the present disclosure can be produced by a method known to those skilled in the art. For example, coating a slurry containing components for each catalyst layer over a substrate is repeated to produce a catalyst having a desired number of catalyst layers.

EXAMPLES

The following further specifically describes the present disclosure with examples. However, the technical scope of the present disclosure is not limited to the examples.

Catalyst Preparation

Used Raw Material

Material 1: $Al_2O_3$: 1 mass %—$La_2O_3$, 99 mass %—$Al_2O_3$
Material 2: pyrochlore OSC material (first OSC material): 51 mass %—$CeO_2$, 46 mass %—$ZrO_2$, 3 mass %—$Pr_2O_3$
Material 3: ACZ (second OSC material): 30 mass %—$Al_2O_3$, 20 mass %—$CeO_2$, 44 mass %—$ZrO_2$, 2 mass %—$La_2O_3$, 2 mass %—$Y_2O_3$, 2 mass %—$Nd_2O_3$
Material 4: AZ: 30 mass %—$Al_2O_3$, 60 mass %—$ZrO_2$, 4 mass %—$La_2O_3$, 4 mass %—$Y_2O_3$, 2 mass %—$Nd_2O_3$
Material 5: Rh nitrate: rhodium nitrate
Material 6: Rh/AZ: material having Rh of material 5 supported by material 4
Substrate: 875 cc (400 cells square, wall thickness 4 mil) cordierite honeycomb substrate Preparation of Material 2 (Pyrochlore OSC Material)

The pyrochlore OSC material was prepared so as to have a composition of 51 mass % of $CeO_2$, 46 mass % of $ZrO_2$, and 3 mass % of $Pr_2O_3$ according to the description of examples in JP 2016-112489 A.

Preparation of Material 6 (Rh/AZ)

0.45 g/L (based on Rh amount) of the material 5 and the material 4 were sequentially added to distilled water while stirring them, subsequently, stirred for ten minutes, and subsequently, calcined at 500° C. for two hours by an electric furnace, thus obtaining the material 6.

Catalyst Preparation

The material 6, the material 1, the material 2, the material 3, and an $Al_2O_3$ based binder were added to distilled water and stirred for about ten minutes, and the materials were suspended, thus preparing slurries with constant amounts of the material 6 and the material 1 and different amounts of the material 2 and the material 3 as the OSC materials.

The slurry containing the predetermined amounts of the material 2 and the material 3 was poured onto the substrate in a range of up to 60% of the entire length of the substrate from the end portion in the upstream side, an unnecessary part was blown off by a blower, and a substrate wall surface was coated with the materials, thus forming the upstream catalyst layer. Next, the slurry containing the predetermined amounts of the material 2 and the material 3 was poured onto the substrate, on which the upstream catalyst layer was formed, in a range of up to 60% of the entire length of the substrate from the end portion in the downstream side, an unnecessary part was blown off by the blower, and the substrate wall surface was coated with the materials, thus forming the downstream catalyst layer. Finally, after drying by a dryer at 120° C. for two hours, calcining was performed by an electric furnace at 500° C. for two hours, thus preparing catalysts No. 1 to No. 10. In each of the obtained catalysts, coating lengths of the upstream catalyst layer and the downstream catalyst layer are each 60% of the entire length of the substrate, and a part of the downstream catalyst layer overlaps a part of the upstream catalyst layer.

Table 1 illustrates compositions of the OSC materials in the upstream catalyst layer and the downstream catalyst layer for the catalysts No. 1 to No. 10. In Table 1, an ACZ proportion means a proportion of the mass of ACZ based on a total mass of ACZ and the pyrochlore OSC material. Each of the upstream catalyst layer and the downstream catalyst layer contains 10 g of the material 1 ($Al_2O_3$) and 10 g of the material 6 (Rh/AZ). In Table 1, the catalysts No. 3 and No. 4 are catalysts of Examples, and the catalysts No. 1, No. 2, and No. 5 to No. 10 are catalysts of Comparative Examples.

TABLE 1

| | Upstream catalyst layer | | | Downstream catalyst layer | | |
|---|---|---|---|---|---|---|
| No. | ACZ(g) | Pyrochlore OSC material (g) | ACZ proportion | ACZ(g) | Pyrochlore OSC material (g) | ACZ proportion |
| 1 | 40 | 15 | 0.73 | 50 | 5 | 0.91 |
| 2 | 40 | 15 | 0.73 | 40 | 15 | 0.73 |
| 3 | 40 | 15 | 0.73 | 30 | 25 | 0.55 |
| 4 | 40 | 15 | 0.73 | 15 | 40 | 0.27 |
| 5 | 40 | 15 | 0.73 | 5 | 50 | 0.09 |
| 6 | 50 | 5 | 0.91 | 40 | 15 | 0.73 |
| 7 | 30 | 25 | 0.55 | 40 | 15 | 0.73 |
| 8 | 15 | 40 | 0.27 | 40 | 15 | 0.73 |
| 9 | 5 | 50 | 0.09 | 40 | 15 | 0.73 |
| 10 | 50 | 5 | 0.91 | 50 | 5 | 0.91 |

Durability Test

The durability test was performed for each of the prepared catalysts using an actual engine. Specifically, the durability test was performed as follows. The catalysts were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 50 hours.

OSC Performance Evaluation

For each of the catalysts subjected to the durability test under the above-described condition, the OSC performance was evaluated using an actual engine. Specifically, the catalysts were each installed to an exhaust system of a L-type four-cylinder engine, and the exhaust gas was introduced to the catalyst at the gas temperature of 600° C. by the gas amount of 20 g/s while switching the air-fuel ratio (A/F) in a range between 15.1 and 14.1. The OSC amount was calculated from the behavior of a post-catalyst $O_2$ sensor.

Figure 3:
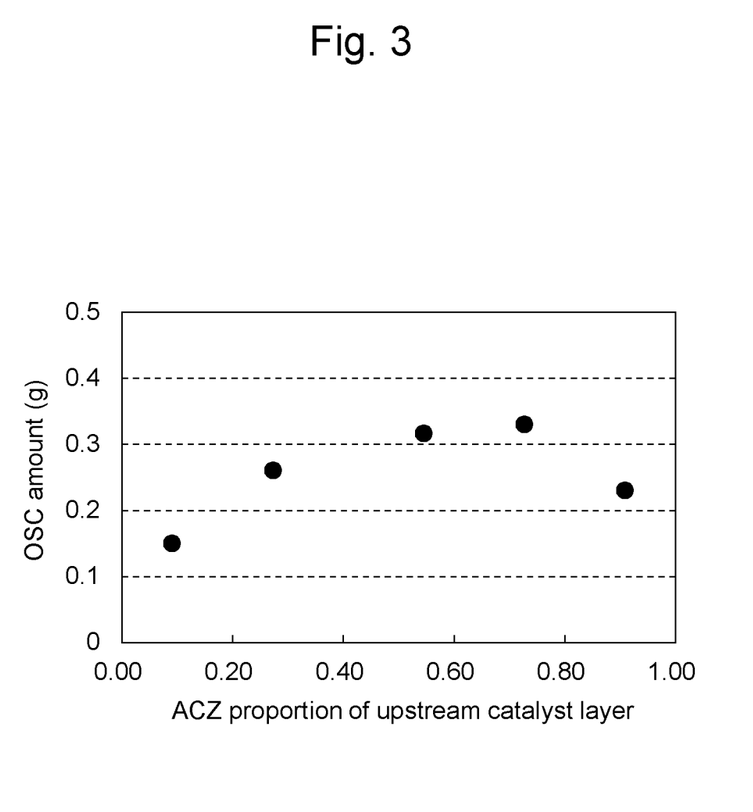
FIG. 3 is a graph illustrating a relation between an ACZ proportion in an upstream catalyst layer and an OSC performance in an example.
Figure 4:
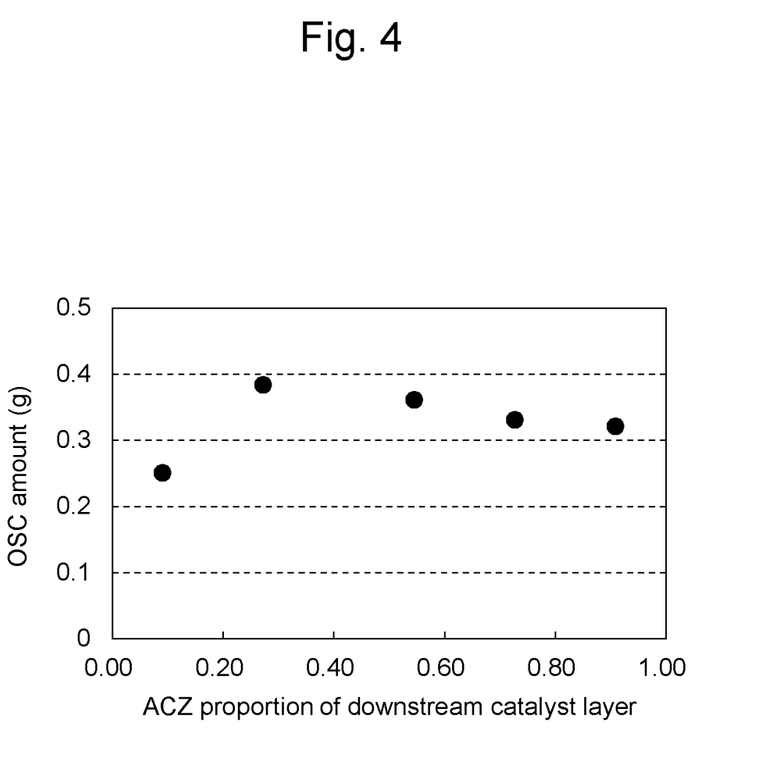
FIG. 4 is a graph illustrating a relation between an ACZ proportion in a downstream catalyst layer and an OSC performance in the example.

FIG. 3 and FIG. 4 illustrate the results of the OSC performance evaluation. FIG. 3 illustrates a relation between the ACZ proportion in the upstream catalyst layer and the OSC performance (in FIG. 3, illustrated as OSC amount) when the ACZ proportion in the downstream catalyst layer is constant (ACZ proportion=0.73). The catalysts illustrated in FIG. 3 are the catalysts No. 9, No. 8, No. 7, No. 2 and No. 6 in the ascending order of the ACZ proportion. Meanwhile, FIG. 4 illustrates a relation between the ACZ proportion in the downstream catalyst layer and the OSC performance (in FIG. 4, illustrated as OSC amount) when the ACZ proportion in the upstream catalyst layer is constant (ACZ proportion=0.73). The catalysts illustrated in FIG. 4 are the catalysts No. 5, No. 4, No. 3, No. 2, and No. 1 in the ascending order of the ACZ proportion.

As illustrated in FIG. 3, the ACZ proportion of the upstream catalyst layer has an intended range to provide the high OSC performance, and the ACZ proportion in a range of from 0.55 to 0.73 provided the high OSC performance. Here, in the data of the OSC performance illustrated in FIG. 3, the ACZ proportion of the downstream catalyst layer is 0.73, and it is out of the specific range in the present disclosure. However, it is considered that the exhaust gas discharged from the engine directly flows into the upstream catalyst layer, and therefore, the OSC performance of the upstream catalyst layer is less likely to be affected by the OSC material of the downstream catalyst layer. Accordingly, it can be considered that the intended range of the ACZ proportion of the upstream catalyst layer is an intended range to any ACZ proportion of the downstream catalyst layer.

As illustrated in FIG. 4, the ACZ proportion of the downstream catalyst layer has an intended range to provide the high OSC performance, and the ACZ proportion in a range of from 0.27 to 0.55 provided the high OSC performance.

As illustrated in FIG. 3 and FIG. 4, the catalyst having the ACZ proportion of the upstream catalyst layer in a range of from 0.55 to 0.73 and the ACZ proportion of the downstream catalyst layer in a range of from 0.27 to 0.55 provides the high OSC performance. In the upstream catalyst layer into which the exhaust gas discharged from the engine directly flows, since the exhaust gas concentration is high, the reaction easily occurs. In the downstream catalyst layer, since the exhaust gas concentration is low, it is difficult to cause the reaction. Thus, in the upstream catalyst layer and the downstream catalyst layer which are different in reactivity, two OSC materials which are different in oxygen storage/release rate and oxygen storage/release amount are used together, and their proportions are optimized in each layer, thereby allowing the efficient use of the OSC materials, thus allowing the catalyst to provide the high OSC performance.

Figure 5:
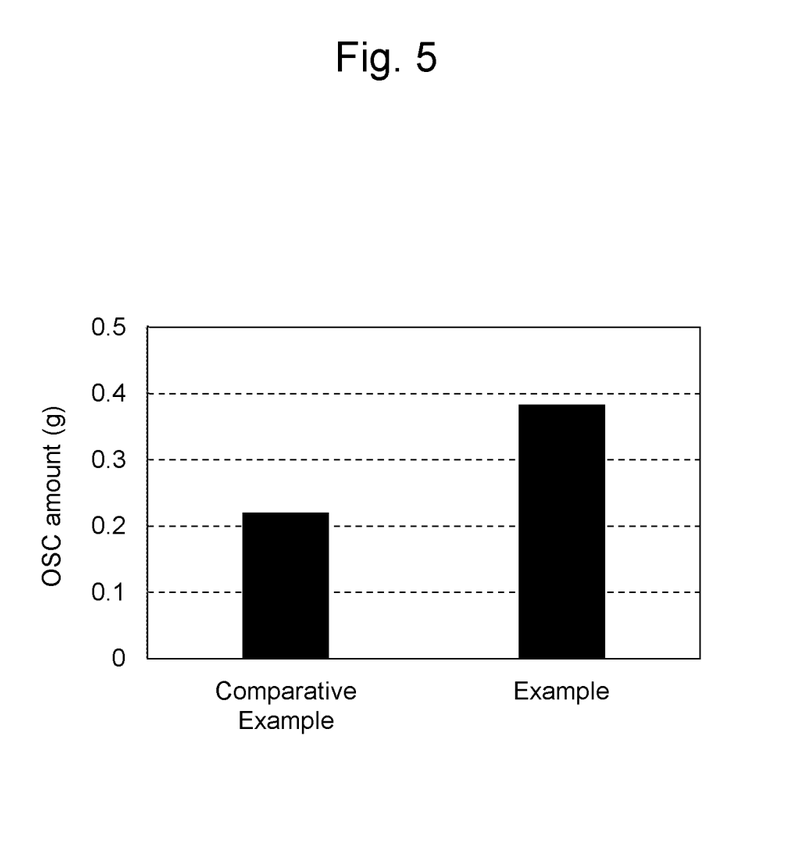
FIG. 5 is a graph illustrating an OSC performance of catalysts in Comparative Example and Example.

FIG. 5 illustrates the OSC performance of the catalysts in Comparative Example and Example. The catalyst No. 10 corresponding to a conventional product was used as Comparative Example, and the catalyst No. 4 was used as Example. In the catalyst of Comparative Example, while the total content of the OSC materials are the same as that in the catalyst of Example, the ACZ proportion is different in each of the upstream catalyst layer and the downstream catalyst layer. As illustrated in FIG. 5, the catalyst of Example having the ACZ proportion optimized in each of the upstream catalyst layer and the downstream catalyst layer provided the OSC performance higher than that of the catalyst of Comparative Example having the constant ACZ proportion in each of the upstream catalyst layer and the downstream catalyst layer. It is considered that the exhaust gas purification performances are equivalent between the catalysts of Example and Comparative Example because the total contents of the OSC materials in the catalysts are the same.

All publications, patents, and patent applications cited herein are incorporated herein by reference in their entirety.

What is claimed is:

1. An exhaust gas purification catalyst comprising:
   a substrate; and
   a catalyst layer which is formed on the substrate and consists of one layer,
   wherein the catalyst layer contains a catalyst metal, a first OSC material having a pyrochlore structure, and a second OSC material having a higher oxygen storage/release rate than the first OSC material, and wherein the catalyst layer consists of an upstream catalyst layer formed in an upstream side in a flow direction of an exhaust gas, and a downstream catalyst layer formed in a downstream side in the flow direction of the exhaust gas,
   wherein a proportion of a mass of the second OSC material based on a total mass of the first OSC material and the second OSC material is from 0.55 to 0.73 in the upstream catalyst layer,
   wherein a proportion of a mass of the second OSC material based on a total mass of the first OSC material and the second OSC material is from 0.27 to 0.55 in the downstream catalyst layer, and
   wherein the catalyst metal is Rh.

2. The exhaust gas purification catalyst according to claim 1, wherein the first OSC material and the second OSC material are ceria-zirconia based composite oxides.

3. The exhaust gas purification catalyst according to claim 1, wherein the upstream catalyst layer is formed in a range of from 40% to 80% of an entire length of the substrate from an end portion in the upstream side, and the downstream catalyst layer is formed in a range of from 40% to 80% of the entire length of the substrate from an end portion in the downstream side.

* * * * *